US005600223A

United States Patent [19]
Shirai

[11] Patent Number: 5,600,223
[45] Date of Patent: Feb. 4, 1997

[54] BATTERY CASE FOR PORTABLE TERMINAL UNIT

[75] Inventor: Toshiaki Shirai, Narashino, Japan

[73] Assignee: Uniden Corporation, Chiba, Japan

[21] Appl. No.: 352,488

[22] Filed: Dec. 9, 1994

[30] Foreign Application Priority Data

Jan. 10, 1994 [JP] Japan .......................................... 6-726

[51] Int. Cl.$^6$ ........................................................ H01M 2/10
[52] U.S. Cl. ................................................ 320/2; 429/100
[58] Field of Search .............................. 429/96, 97, 98, 429/99, 100, 163, 177; 320/2; D13/103, 118, 119, 120

[56] References Cited

U.S. PATENT DOCUMENTS 5,244,411  9/1993  Schinke et al. ........................ 429/97 X

FOREIGN PATENT DOCUMENTS

| 2-180459 | 7/1990 | Japan . |
| 4-40462 | 4/1992 | Japan . |
| 4-256222 | 9/1992 | Japan . |
| 4-328937 | 11/1992 | Japan . |
| 5-9057 | 2/1993 | Japan . |
| 5-160757 | 6/1993 | Japan . |

OTHER PUBLICATIONS

Service Manual PRO-51 200-Channel Direct-Entry Programmable Scanner Catalog No. 20-308.

*Primary Examiner*—Robert Nappi
*Assistant Examiner*—Patrick B. Law
*Attorney, Agent, or Firm*—Lowe, Price, LeBlanc & Becker

[57] ABSTRACT

A novel battery case for a portable terminal unit includes a first battery storage case monolithically integrated with the basic body of the portable terminal unit for accommodating two batteries within an opening thereof, the batteries being arrayed in parallel in one step. A second battery storage case in which two batteries can be set within an opening thereof, the batteries being arrayed in parallel in a separate step, is also provided. The second storage case can be mounted onto the basic body of the portable terminal unit so that the opening of the first battery storage case will be opposite to the opening of the second battery storage case.

18 Claims, 5 Drawing Sheets

BATTERY CASE FOR PORTABLE TERMINAL UNIT

FIELD OF THE INVENTION

The present invention relates to a battery case for a portable terminal unit, and more particularly to a battery case to store therein a plurality of batteries.

BACKGROUND OF THE INVENTION

A battery or batteries are generally used as a power supply unit for a portable terminal unit, and the batteries are accommodated in a battery case. There are various types of battery case for a portable terminal unit, and some of them are incorporated in a basic body of a portable terminal unit, while the others are attached to or detached from a basic body of a portable terminal unit.

FIG. 3 is a perspectively view illustrating an example of a conventional type of battery case for a portable terminal unit. This battery case comprises a battery storage case 2 in which four batteries are accommodated, an accommodating section 5, for accommodating the battery storage case 2, provided on a rear surface of a basic body of a portable terminal unit 3 in the side facing the case, and a battery cover 6 which is a cover for this accommodating section.

The battery storage case 2 is a box in which two batteries can be set in along the vertical direction in the figure, and the batteries set therein are sustained between a − (minus) side spring 7 and a + (plus) side contact arranged in the storage case 2. The battery storage case 2, with batteries set therein, is stored in the accommodating section 5 of the portable terminal unit 3, and is covered by a battery cover 6. The cover 6 is fixed by engaging a convex section 9 of the cover 6 in a concave section 10 arranged in the portable terminal unit 3.

In this type of battery case as described above, as the battery storage case 2 is used, the portable terminal unit 3 becomes larger by a wall thickness t (approx. 4 mm) of the storage case. It is disadvantageous for the width W of the portable terminal unit 4 to become larger. It is also disadvantageous for the number of parts forming battery storage case 2 to increase.

FIG. 4 is a perspective view illustrating another example of a conventional type of battery case for a portable terminal unit. This battery case shown in FIG. 4 similar to the one shown in the example of the conventional type shown in FIG. 2, but is different from the latter in that the longitudinal direction of the battery 1 is parallel to the longitudinal direction of the portable terminal unit 3 when the battery 1 is accommodated in the portable terminal unit 3. At a bottom section of the portable terminal unit 3 is provided an accommodating section 12 to accommodate therein the battery storage case 2. A battery cover 13 for covering the opening of this accommodating section 13 is slid when inserted into the opening.

With this conventional type of battery case, the width W of a portable terminal unit can be reduced, but because of the length D of the battery storage case 2, the total length L of a portable terminal unit becomes disadvantageously longer.

FIG. 5 is a perspective view illustrating another example of a conventional type of portable terminal unit. This battery case comprises a front battery storage case 14 in which two batteries can be accommodated, and a rear battery storage case 15 in which also two batteries can be accommodated. In the side where the front battery storage case 14 and the rear battery storage case 15 engage the bottom section of the portable terminal unit 3 are provided slender concave sections 16, 17 for sliding movement. On the other hand, at a bottom section of the portable terminal unit 3 are provided slender convex sections 18, 19 for sliding movement.

In the conventional type of battery case as described above, two batteries are set in the front battery storage case 14 and the rear battery storage case 15 respectively, then openings of the cases are overlaid, and the concave sections 16, 17 are slid in the direction indicated by an arrow mark 20 and connected to the convex sections 18, 19 in the bottom section of the portable terminal unit 3. The storage cases 14, 15 thus are attached to the portable terminal unit 3.

In the conventional technology described above, a battery case is not incorporated in the portable terminal unit 3, but is detachably attached to the latter, so that there are some restrictions in designing the portable terminal unit 3, and also as the battery case is divided into two portions, the number of parts disadvantageously increases.

In addition, it has been impossible to provide any other member used in the portable terminal unit such as a speaker in the battery case, and an additional space is required for accommodation such additional members, which makes it difficult to minimize a size of the unit.

SUMMARY OF THE INVENTION

It is an object of the present invention to provide a battery case allowing reduction of width as well as full length of a portable terminal unit, allowing for batteries to be accommodated easily, not receiving any restriction in designing a basic body of a portable terminal unit, and furthermore enabling reduction of number of parts thereof.

A battery case for a portable terminal unit according to the present invention comprises a first battery storage case which is monolithically integrated with a portable terminal unit and in which a plurality of batteries are set from the opening and laid in parallel in one step; and a second battery storage case in which a plurality of batteries are set from the opening and laid in a separate step and which can be set in a basic body of the portable terminal unit so that the opening will face the opening of the first battery storage case.

In an embodiment where a basic body of a portable terminal unit has a front case and a rear case, the first battery storage case is provided on an extension of the front case with an opening of the first battery storage case opened in a direction opposite to the front case.

In an embodiment where a basic body of the portable terminal unit has a front case and a rear case, the first battery storage case comprises a battery holding section provided on an extension of the rear case and an accommodating section provided on an extension of the front case for accommodating therein the battery holding section, with an opening of the first battery storage case opened in a direction opposite to the front case.

Also the direction in which batteries are arrayed in the first battery storage case as well as in the second battery storage case is one in which the longitudinal direction of each battery is perpendicular to that of the portable terminal unit.

Furthermore the second battery storage case has a first engaging section for engaging with a portable terminal unit so that the opening will be opposite to then opening of first battery storage case.

Other objects and features of this invention will become understood from the following description with reference to the accompanying drawings.

DESCRIPTION OF THE PREFERRED EMBODIMENTS

Description is made hereinafter for embodiments of a battery case for a portable terminal unit according to the present invention.

Figure 1:
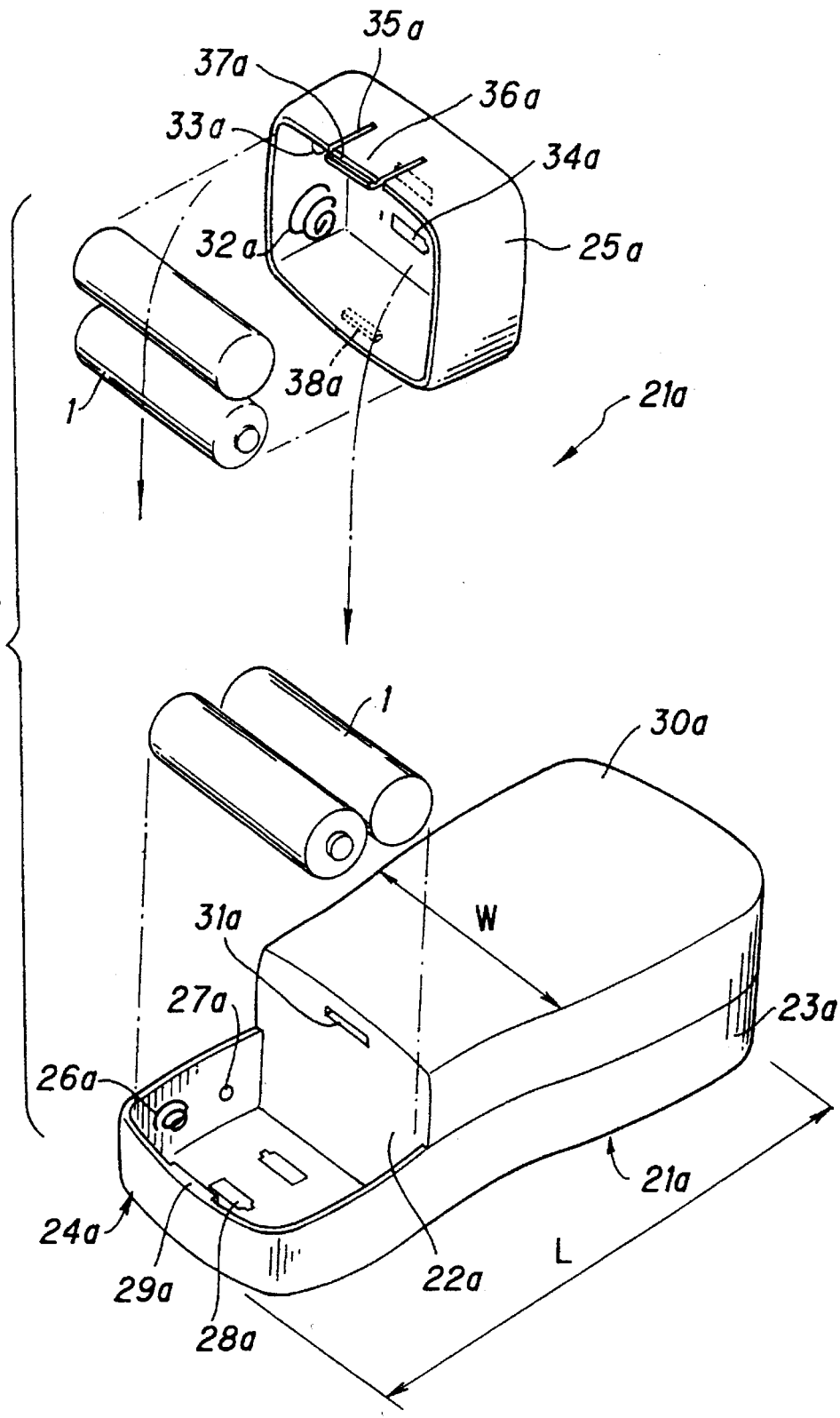
FIG. 1 is a perspective view of a battery case for a portable terminal unit according to Embodiment 1 of the present invention.

Referring to FIG. 1, a battery case, according to the invention, comprises, in a first embodiment thereof, a box-shaped battery storage case 24a for accommodating two batteries, monolithically provided on the extension of a front case 23a of a portable terminal unit 21a in the side of a bottom section 22a of the portable terminal unit 21a, and a box-shaped battery storage case 25a for batteries therein, which is detachably mounted on the basic body of the portable terminal unit 21a.

In the storage case 24a monolithically provided on the basic body of the portable terminal unit 21a are provided two pairs of − (minus) side spring 26a and + (plus) side contact 27a in the inner side of the side wall of the case. Two batteries 1 are arrayed in parallel in one stage, and are held between the − (minus) side spring 26a and the + (plus) side contact 27a respectively. In the bottom section of the storage case 24a is a polarity display mark 28a to prevent batteries from being set with incorrect polarity.

In a side wall edge section of the storage case 24a, opposing the bottom section 22a of the portable terminal unit 21a, is provided a convex section 29a for engagement. Also in a bottom section in the side of a rear case 30a on the portable terminal unit 21a is provided a concave section 31a.

On the other hand, in the inner side of a side wall of the battery storage case 25a, detachably mounted on the portable terminal unit 21a, are provided two pairs of − (minus) side spring 32a and + (plus) side contact 33a. Two batteries 1 are stored in parallel in one step, and are held between the − (minus) side spring 32a and the + (plus) side contact 33a respectively. In the bottom section of the storage case 25a is a polarity display mark 34a to prevent batteries from being set with incorrect polarity.

In a side wall of the battery storage case 25a are provided notches 35a in both sides thereof, while in the side of an opening of the storage case 25a is provided an engaging section 36a projecting beyond the peripheral side wall. On an external surface of the engaging section 36a is provided a concave section 37a for engagement with the convex section 29a of the storage case 24a in the basic body of the portable terminal unit. The engaging section 36a, as described above has notches 35a provided in both sides thereof, and the battery case is generally elastic because it is made of plastic material. Also on the external surface of the side wall opposing the engaging section 36a is provided a convex section 38a engaging the convex section 31a provided at a bottom section of the basic body 21a of the portable terminal unit, such as shown in Service Manual PRO-51 200-CHANNEL DIRECT-ENTRY PROGRAMMABLE SCANNER Catalog Number:20–308, of which disclosure is incorporated by reference.

In the battery case as described above, two batteries 1 are set in the storage case 24a integrated with a portable terminal unit and in the storage case 25a detachably mounted on a portable terminal unit, respectively. In this case, as batteries are not piled in two steps or stages, it is quite easy to set batteries therein, and also as polarity display marks 28a, 34a are on an inner surface of each storage case, batteries can always be set with correct polarity.

When batteries have been set, the battery storage case 25a is mounted on the portable terminal unit 21a so that the former is overlaid on the battery storage case 24a of the portable terminal unit 21a. In other words assembly is such that the opening of the storage case 25a covers the opening of the storage case 24a, and this operation is carried out as follows. Namely the opening of the storage case 25a is overlaid on the opening of the storage case 24a, and the convex section 38a of the storage case 25a is engaged in the concave section 31a of in the bottom section 22a of the portable terminal unit 21a. Then the concave section 37a of the engaging section 36a is engaged in the convex section 29a of the storage case 24a by lightly pushing the engaging section 36a of the storage case 25a. Thus the battery storage case 25a is mounted on the portable terminal unit 21a.

Figure 2:
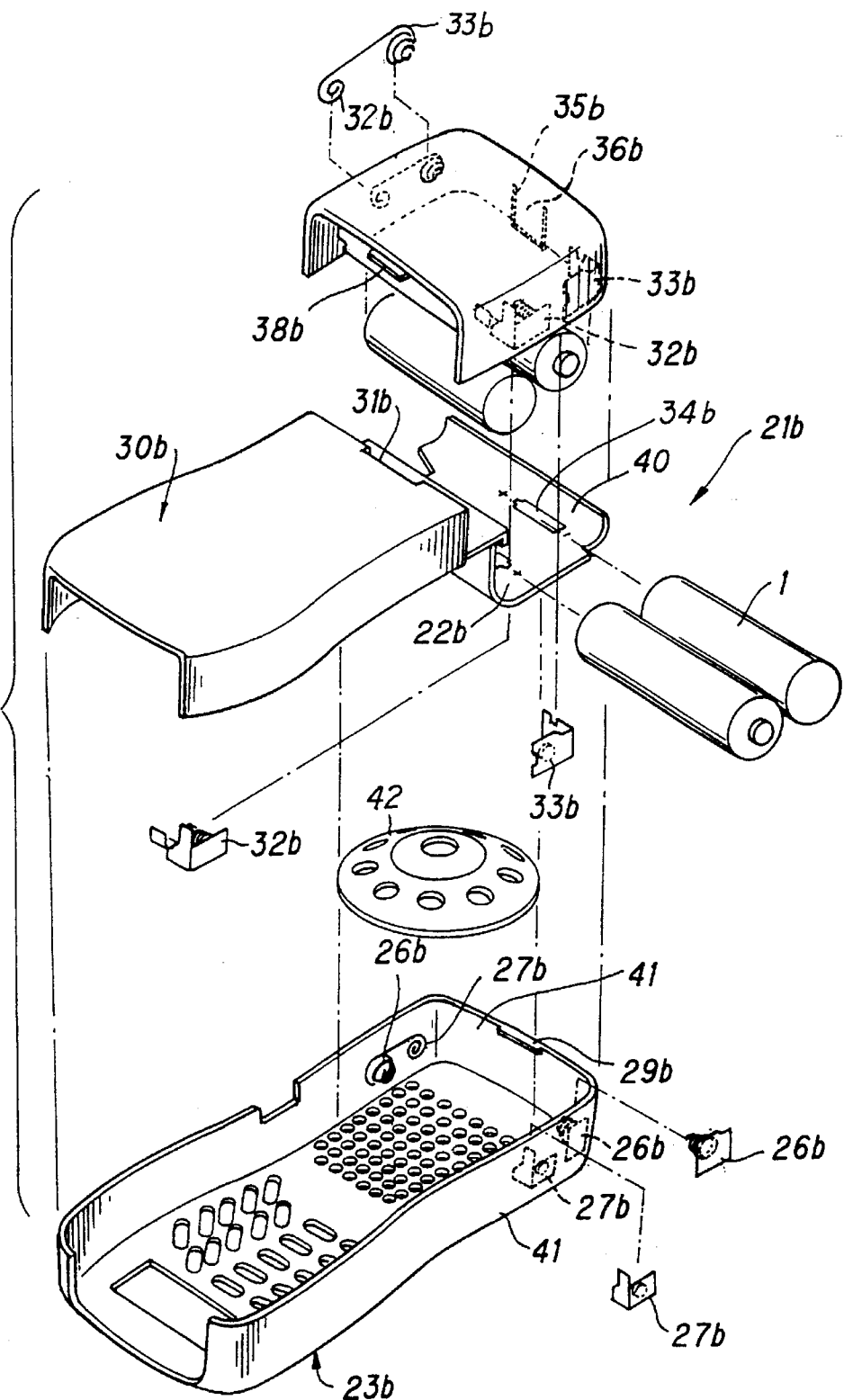
FIG. 2 is a perspective view of a battery case for a portable terminal unit according to Embodiment 2 of the present invention.

Next, a description is made for Embodiment 2 of the present invention with reference to FIG. 2. In this figure, most portions of the configuration are the same as those in Embodiment 1, so that the same reference numerals are assigned to the same sections (however, it should be noted that "a" is added to each reference numeral in Embodiment 1 and "b" to each reference numeral in Embodiment 2 to differentiate Embodiment 1 from Embodiment 2) and description thereof is omitted herein. The difference between Embodiment 2 and Embodiment 1 is that, although the box-shaped battery storage case 24a for accommodating two batteries 1 therein is monolithically provided on the extension of the front case 23a in the bottom surface 22a of the portable terminal unit 21a in Embodiment 1, battery storage case of FIG. 2 comprises storage section 41 of front case 23b and battery holding section 40 of the rear case 30b.

Namely as shown in FIG. 2, battery holding section 40 having a curved form suited to a form of the battery 1 for holding two batteries is provided in bottom section 22b of rear case 30b, the battery holding section being monolithic with the rear case 30b. Also two pairs of − (minus) side springs 26b and + (plus) side contacts 27b are provided in the bottom section 41 of front case 23b in the inner side of a side wall of the storage section 41 having a space for that purpose secured therein.

For this reason, when the rear case 30b and the front case 23b are monolithically set, the battery holding section 40 of the rear case 30b is accommodated in the storage section 41 of the front case 23b. An electrically conductive path for batteries 1, held in the battery holding section 40, is formed by the two pairs of − (minus) side spring 26b and + (plus) side contact 27b in the storage section 41.

Thus, as the battery holding section 40 is provided in the battery storage case in the portable terminal unit 21b, contact fault of the batteries 1 due to such reasons as vibration can be evaded, and furthermore strength of the portable terminal unit 21b can be improved.

The reference numeral 42 indicates a speaker incorporated in the portable terminal unit 21b designed so that a portion of said speaker is inserted into a section under the battery holding section. Namely, the battery holding section 40 plays a role of a partition inside the portable terminal unit 21*b*, forms a space below it, and can accommodate necessary members such as the speaker 42. As a result, dimension of the portable terminal unit 42 in its longitudinal direction can be reduced, which in turn makes it possible the minimize the portable terminal unit as a whole.

Two embodiments of the present invention are described above, but the present invention is not limited to these embodiments. It is needless to say that various types of modification and change are possible within the scope and spirit of the present invention.

For instance, although an example where two batteries are set in each storage case respectively was described in relation to the embodiment above, the number of batteries in practice is not limited to what is shown in this figure. For instance, three batteries may be set in each storage case respectively. However it is required that all batteries are arrayed in parallel in one stage in each storage case. Also it is needless to say that any method of fixing the storage case to the basic body of a portable terminal unit other than that described above may be employed.

As described above, the battery case according to the present invention comprises a battery storage case monolithically integrated with a basic body of a portable terminal unit and a battery storage case detachably mounted on the basic body of the portable terminal unit, so that the advantages as described below are provided.

Figure 3:
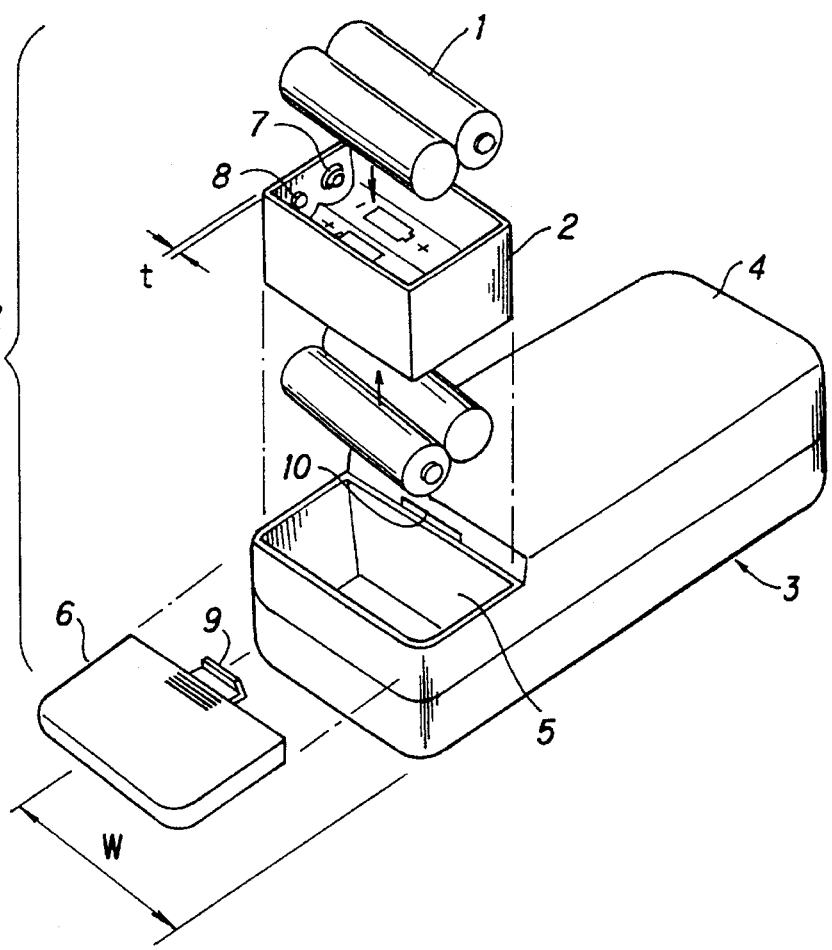
FIG. 3 is a perspective view of a conventional type of battery case for a portable terminal unit.

First, the width W and total length L of a portable terminal unit when a battery case is attached thereto are less than those of a conventional type of battery case as shown in FIG. 3.

Figure 4:
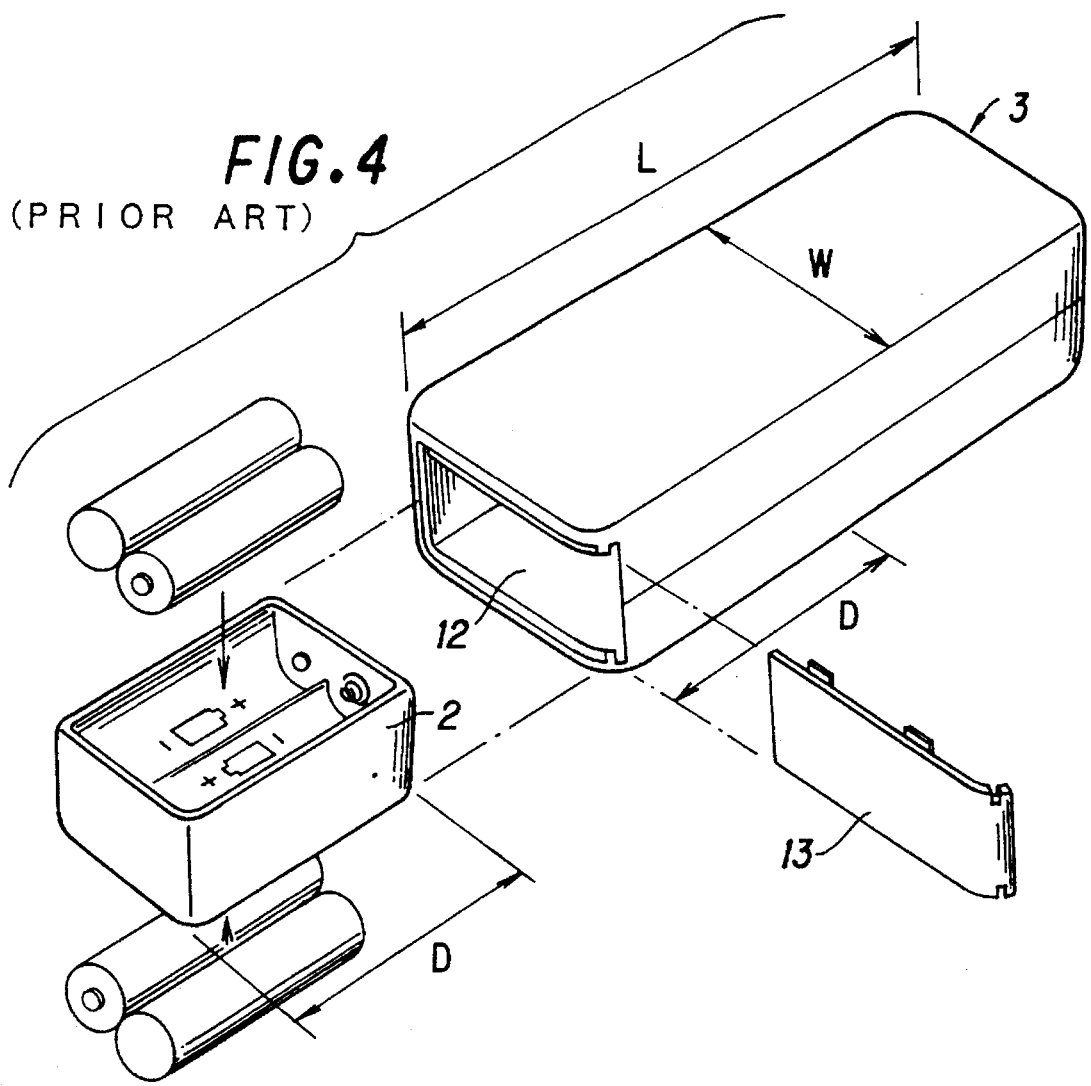
FIG. 4 is a perspective view of a conventional type of battery case for a portable terminal unit.

Second, in the battery case according to the present invention, batteries are set in the case so that the longitudinal direction of each battery will be perpendicular to that of a portable terminal unit. For this reason, the total length L does not become as long as in the conventional type of battery case shown in FIG. 4.

Figure 5:
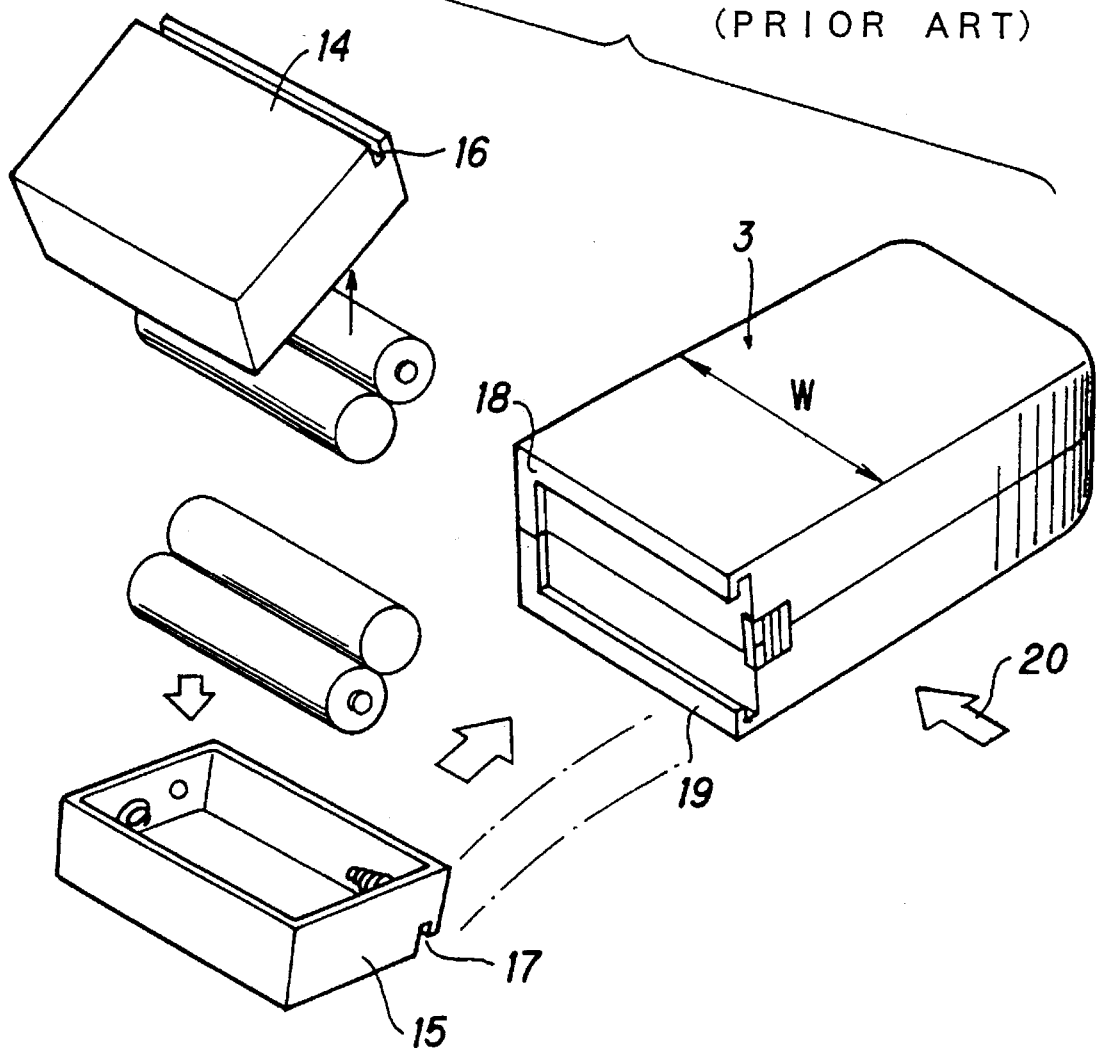
FIG. 5 is a perspective view of a conventional type of battery case for a portable terminal unit.

Third, in the battery case according to the present invention, one of the battery storage cases is monolithically integrated with a basic body of a portable terminal unit, so that the number of parts is smaller than that in the conventional type of battery case shown in FIG. 5. Also, various types of display can be provided on the storage case monolithically integrated with the basic body of the portable terminal unit, so that restrictions in design are fewer as compared to the battery case shown in FIG. 5.

Fourth, in the battery case according to the present invention, contact fault of each battery can be prevented, and furthermore mechanical strength of the basic body of a portable terminal unit can be improved.

Although the invention has been described with respect to a specific embodiment for a complete and clear disclosure, the appended claims are not to be thus limited, but are to be construed as embodying all modifications and alternative constructions that may occur to one skilled in the art which fairly fall within the basic teaching herein set forth.

What is claimed is:

1. A battery case for a portable terminal unit comprising:

a first battery storage case monolithically integrated with a basic body of a portable terminal unit for accommodating therein one or more first batteries from a first opening in said basic body; and a second battery storage case for accommodating one or more second batteries, different from said one or more first batteries, from a second opening in said second battery storage case which can be mounted onto the basic body of said portable terminal unit so that said first opening will be opposite to said second opening;

wherein the basic body of said portable terminal unit comprises a front case and a rear case, said first battery storage case comprises a battery holding section provided on an extension of said rear case and an accommodating section provided on an extension of said front case for accommodating said battery holding section.

2. A battery case for a portable terminal unit according to claim 1, wherein the basic body of said portable terminal unit comprises a front case and a rear case, said first battery storage case is provided on an extension of said front case, and said first opening is in said front case.

3. A battery case for a portable terminal unit according to claim 1, wherein said battery holding section and said front case have a space for constituent members of the portable terminal unit provided therebetween.

4. A battery case for a portable terminal unit according to claim 1, wherein each of the one or more first batteries has a first longitudinal axis and is set in said first storage case so that the first longitudinal axis is perpendicular to a longitudinal axis of said portable terminal unit, and each of said one or more second batteries has a second longitudinal axis and is set in said second storage case so that, with the second storage case mounted, the second longitudinal axis is perpendicular to the longitudinal axis of said portable terminal unit.

5. A battery case for a portable terminal unit according to claim 1, wherein said second battery storage case has an engaging section for engaging with the basic body of said portable terminal unit so that said first opening is opposite to said second opening.

6. A battery case for a portable terminal unit according to claim 1, wherein said second battery storage case is a unit separable from said basic body.

7. A battery case for a portable terminal unit according to claim 1, wherein said first battery storage case has a first pair of electrical contacts engagable with one of said one or more first batteries and said second battery storage case has a second pair of electrical contacts engageable with one of said one or more second batteries.

8. A battery case for a portable terminal unit according to claim 7, wherein said basic body has a length extending between first and second side surfaces and a width extending between third and fourth side surfaces, said length is greater than said width, and a first electrical contact and a second electrical contact of said first pair of electrical contacts are disposed opposite each other with said first electrical contact being located proximate to said third side surface and said second electrical contact being located proximate to said fourth side surface.

9. A battery case for a portable terminal unit according to claim 1, wherein, with said second battery storage case mounted to said basic body, said one or more first batteries and said one or more second batteries are in parallel.

10. A battery case for a portable terminal unit comprising:

a first battery storage case monolithically integrated with a basic body of a portable terminal unit for accommodating therein a first plurality of batteries from a first opening in said basic body said, first plurality of batteries arrayed therein in parallel with each other; and a second battery storage case for accommodating therein a second plurality of batteries, different from the first plurality of batteries, from a second opening in said second battery storage case, said second plurality of batteries arrayed in parallel with each other, which can be mounted on the basic body of said portable terminal unit so that said first opening will be opposite to said second opening;

wherein the basic body of said portable terminal unit comprises a front case and a rear case, said first battery storage case comprises a battery holding section provided on an extension of said rear case and an accommodating section provided on an extension of said front case for accommodating said battery holding section, and said first opening is in said front case.

11. A battery case for a portable terminal unit according to claim 10, wherein the basic body of said portable terminal unit comprises a front case and a rear case, said first battery storage case is provided on an extension of said front case, and said first opening is in said front case.

12. A battery case for a portable terminal unit according to claim 10, wherein said battery holding section and said front case have a space for constituent members of the portable terminal unit provided therebetween.

13. A battery case for a portable terminal unit according to claim 10, wherein each of said first plurality of batteries has a first longitudinal axis and is set in said first storage case so that the first longitudinal axis is perpendicular to a longitudinal axis of said portable terminal unit, and each of said second plurality of batteries has a second longitudinal axis and is set in said second storage case so that, with said second storage case mounted, the second longitudinal axis is perpendicular to the longitudinal axis of said portable terminal unit.

14. A battery case for a portable terminal unit according to claim 10, wherein said second battery storage case has an engaging section for engaging with the basic body of said portable terminal unit so that said first opening is opposite to said second opening.

15. A battery case for a portable terminal unit according to claim 10, wherein said second battery storage case is a unit separable from said basic body.

16. A battery case for a portable terminal unit according to claim 10, wherein said first battery storage case has a first plurality of pairs of electrical contacts, each of said first plurality of pairs is engageable with a respective one of said first plurality of batteries, said second battery storage case has a second plurality of pairs of electrical contacts, and each of said second plurality of pairs is engageable with a respective one of said second plurality of batteries.

17. A battery case for a portable terminal unit according to claim 16, wherein said basic body has a length extending between first and second side surfaces and a width extending between third and fourth side surfaces, said length is greater than said width, and a first electrical contact and a second electrical contact of each of said first plurality of pairs of electrical contacts are disposed opposite each other with said first electrical contact being located proximate to said third side surface and said second electrical contact being located proximate to said fourth side surface.

18. A battery case for a portable terminal unit according to claim 10, wherein, with said second battery storage case mounted to said basic body, said first plurality of batteries and said second plurality of batteries are in parallel.

\* \* \* \* \*